Figure 1:
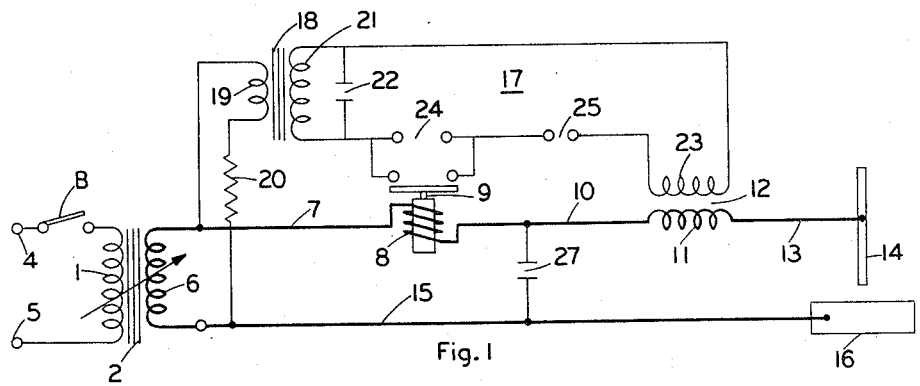

Jan. 6, 1959        A. U. WELCH        2,867,730

ARC WELDING APPARATUS

Filed Nov. 14, 1957

Inventor:
Alanson U. Welch
by Leslie C. Byer
His Attorney

United States Patent Office 2,867,730
Patented Jan. 6, 1959

2,867,730

ARC WELDING APPARATUS

Alanson U. Welch, York, Pa., assignor, by mesne assignments, to Air Reduction Company, Incorporated, New York, N. Y., a corporation of New York Application November 14, 1957, Serial No. 696,556

8 Claims. (Cl. 307—3)

My invention relates to arc welding apparatus in which high-frequency spark gap oscillators are used for striking and stabilizing welding arcs energized from low-voltage sources of supply.

High-voltage, high-frequency generators have been employed in arc welding systems to provide ionization at the arc gap which will enable the low-voltage source of supply to jump to gap and to increase the ionization at the arc gap when the welding current passes through zero, as in alternating current arc welding, or when the current decreases to a low value, as in direct current arc welding when, for example, the arc is supplied from an alternating current source of supply through a single-phase rectifier.

A spark gap oscillator is particularly suited for supplying high frequency to an arc welding circuit because it automatically adjusts its frequency to match the impedance of the welding circuit. This means that the fundamental frequency of radiated power from a spark gap oscillator varies depending upon welding circuit conditions which are changeable because of the varying lengths of the welding leads and because the arrangement of the welding leads in varying configurations changes their inductance and capacity. In fact, the fundamental frequency of the welding circuit varies considerably depending on whether the arc is open-circuited or short-circuited. This variation of fundamental frequency may, for example, be from 400 kilocycles at open-circuit to 700 kilocycles when the spark is jumping from the welding electrode to the work.

These changes in the fundamental operating frequency of spark gap oscillators and the wide range of harmonics emitted by them during operation produce a smear of interference across a very large portion of the useful radio frequency spectrum and consequently their use is quite undesirable and has been prohibited except under conditions where the restrictions on radiated power are so severe that the power for striking and maintaining a welding arc is not enough to satisfy operating requirements.

Tube type oscillators which provide a continuous fixed frequency output have been proposed as substitutes for spark gap oscillators but their use is quite impractical because of the expense involved in providing circuits that will pass currents of the order of one hundred amperes and because the changes in the natural oscillating frequencies of the welding circuits above referred to make it impossible to tune a welding circuit and keep it tuned so that it will present the proper impedance to a fixed frequency oscillator and thereby effectively use the power from the oscillator. Furthermore, a tube type oscillator associated with an arc welding circuit should have its output pulsed into very short intervals to avoid diathermy heating of the operator's hand in case of leakage and this introduces an added factor of expenses not involved when using spark gap oscillators whose inherent operation satisfies this requirement. The use of a fixed frequency tube oscillator is further complicated because the few very narrow slots allocated for unlimited radiation are no narrow that super-quality frequency control is required of tube type oscillators to keep their operation within these narrow bands.

It has also been proposed to use pulsed tube oscillators which supply periodic direct current impulses of controlled magnitude to the welding circuit for striking and maintaining the welding arc but these pulsed tube oscillators have not proved technically feasible or economical for reasons akin to those recited above in connection with fixed frequency tube type oscillators.

It is thus apparent that it is highly desirable to be able to use a spark gap oscillator for striking and stabilizing the operation of a welding arc if this can be done under conditions which will prevent objectionable radio interference radiation.

It is an object of my invention to reduce to acceptable values radio interference occasioned by the operation of welding systems employing high frequency spark gap oscillators which are fully effective for striking and stabilizing welding arcs.

It is also an object of my invention to provide a spark gap oscillator which can be controlled so as to provide a relatively high voltage, high frequency voltage for striking an arc and a relatively low voltage, high-frequency voltage for maintaining the arc once it has been established.

It is another object of my invention to provide a spark gap oscillator which will supply high-frequency impulses at a rate and voltage suitable for arc striking purposes and which will increase the rate of supply of said impulses and decrease the magnitude of their voltage while stabilizing the welding arc so that, during welding, radio interference is reduced to acceptable values and substantially equal values of current are supplied to the welding arc during cycles of alternating current of opposite polarity.

It is a further object of my invention to provide in an arc welding system a high-frequency spark gap oscillator, having the above described operating characteristics and which is rendered operative only when conditions in the welding circuit require the high-frequency for arc striking or arc stabilization.

More particularly, it is an object of my invention to control the length of the gap of a high-frequency spark gap oscillator in accordance with arcing conditions in the welding circuit for attaining the above-recited results.

Further objects of my invention will become apparent from a consideration of the following description of several embodiments thereof and the scope of my invention will be pointed out in the appended claims.

In practicing my invention, high-frequency arc striking and arc stabilizing voltage is supplied by a high-frequency spark gap oscillator through the welding circuit conductors to a welding arc supplied from a welding current source having a drooping volt-ampere characteristic and means responsive to an electrical change in the welding circuit upon the establishment of an arc supplied therethrough is employed for decreasing the length of the spark gap of the high-frequency oscillator and its output voltage from a relatively high value sufficient to strike an arc across an arc gap to a relatively low value sufficient to stabilize the operation of said arc. In addition, means responsive to the voltage of the welding current source are also provided for energizing the high-frequency spark gap oscillator with a voltage sufficient to set it into operation only when the voltage of the welding current source is above a predetermined value corresponding to the operating voltage of a welding arc supplied by the welding current source through the welding circuit.

When the spark gap oscillator of my system is operating with a long spark gap, for example at ten pulses of high-frequency power in each one-half cycle of a sixty-cycle power current supply, the arc will be started in a time interval which is generally less than ten cycles of a sixty-cycle source of supply; i. e. within one-sixth of a second. During this starting period, power current of low magnitude flows immediately after each high-frequency impulse until enough total heat is provided to permit the establishment of a power arc across the gap between the electrode and the work and the stable flow of welding current from its source of supply. The flow of this high-frequency, high voltage current in most instances will create a radio interference effect which is unobjectionable because, at most, it will appear in a radio receiver as a very short buzz or click. Once the arc has been established, however, the spark gap of the oscillator is shortened and the oscillator consequently will produce a larger number of impulses per second but each impulse will be of lower magnitude. Furthermore, by limiting operation of the oscillator to those instances when the arc tends to go out, it is apparent that, in alternating current arc welding, the oscillator will function with only a few impulses of low magnitude only at the current zero periods of the welding arc and usually only at the beginning of half cycles when the work is negative and needs a stablizing impulse. Thus, any radio interference produced by operation of the oscillator for stabilizing the welding arc is greatly reduced due not only to the reduced number of high-frequency impulses but also because these impulses are of low magnitude. Furthermore, the more rapid impulses of low magnitude will, in alternating current arc welding, cause the welding current to flow immediately after its current passes through zero with the result that the half waves of current of opposite polarity supplied to the arc will be more nearly of the same magnitude and thus produce a less unbalanced half-wave flow of current which will reduce the arc generation of a direct current component which, if of sufficient magnitude, not only is detrimental to the welding action of the arc, but may also produce saturation effects in the power source which are either undesirable or cannot be tolerated.

Figure 2:
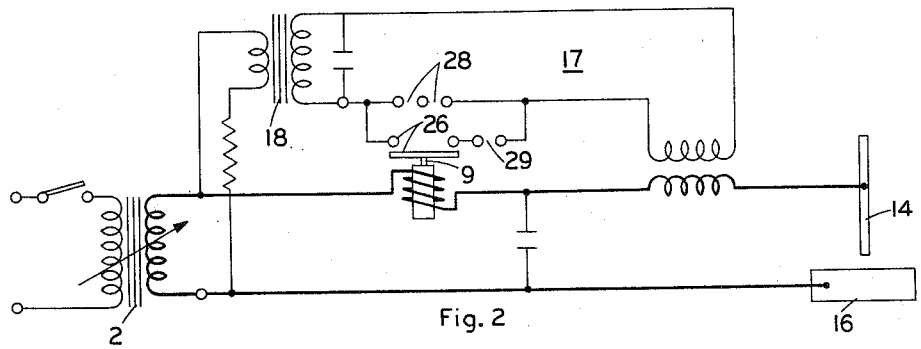
Figure 3:
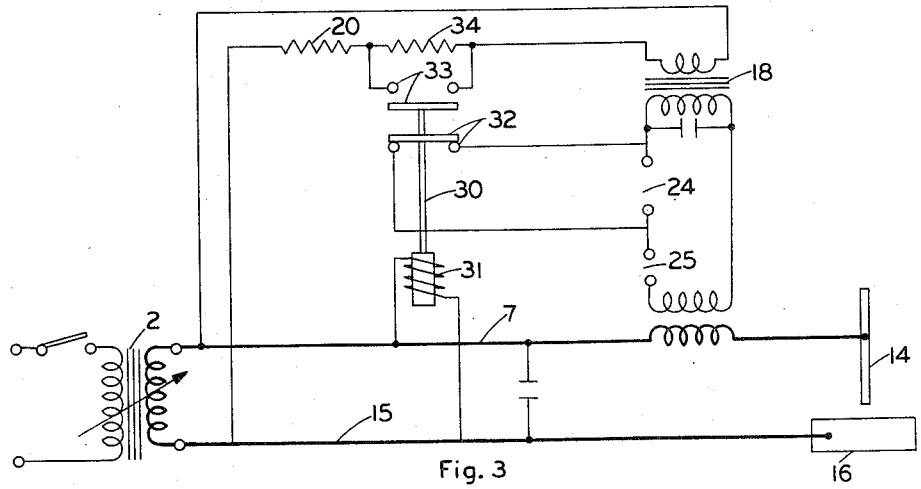

For a more complete understanding of the nature and scope of my invention, reference may be made to the following description of the embodiments thereof shown in the accompanying drawing in which:

Fig. 1 is a diagrammatic representation of a welding system embodying my invention;

Fig. 2 is another diagrammatic representation of another embodiment of my invention wherein parallel connected spark gaps are employed in the oscillator instead of the series-connected gaps shown in Fig. 1; and Fig. 3 is another diagrammatic representation of a third embodiment of my invention in which the amount of current limiting resistance in the input circuit of the oscillator is controlled in accordance with the control of the length of arc gap in the oscillator.

In Fig. 1, the primary winding 1 of an adjustable reactance transformer 2 is connected through a switch 3 to terminals 4 and 5 which are connectable to a source of alternating current supply such as the sixty-cycles usually available although other commercial sources of alternating current of different frequency may be employed for energizing the welding transformer. One terminal of the secondary 6 of the welding transformer is connected through a conductor 7, operating coil 8 of a current relay 9, conductor 10, the secondary 11 of an air core coupling transformer 12 and conductor 13 to a welding electrode 14. The other terminal of the secondary 6 of the welding transformer is connected through a conductor 15 to the work 16 which constitutes an electrode cooperating with electrode 14 for supporting a welding arc supplied with current by transformer 2.

A spark gap oscillator 17 has an input circuit comprising a low-reactance control transformer 18 having its primary winding 19 connected through a load-limiting resistor 20 across the welding circuit conductors 7, 15 which is the same as being connected across the output terminals of the welding current source of supply 2. The secondary winding 21 of control transformer 18 is connected across a capacitor 22 which forms part of an oscillatory circuit which also includes the primary winding 23 of coupling transformer 12 and the series-connected spark gaps 24 and 25. These gaps are of unequal width with gap 24 being larger than gap 25. The normally open contacts 26 of relay 9 will provide a short-circuit about gap 24 when relay 9 is operated by the flow of welding current through its coil 8. The high frequency supplied by oscillators 17 is introduced into the welding circuit by coupling transformer 12. A by-pass capacitor 27 is provided to shunt the high-frequency supplied by the output circuit of oscillator 17 from that portion of the welding circuit including relay 9 and welding transformer 2 and for supplying it directly to the arc gap between electrodes 14, 16 or the arc established between these electrodes.

The adjustable reactance transformer constitutes a source of supply having at its output terminals a drooping volt-ampere characteristic. For example, its open-circuit output voltage may be 75 volts and its closed circuit output voltage equal that of the welding arc; namely, 15 to 25 volts. The adjustable reactance feature of the transformer makes it possible to adjust the welding current to the values required for the welding operation to be performed.

The control transformer 18 provides sufficient voltage to the oscillating circuit of the high-frequency generator to cause it to operate by breakdown at one or both spark gaps only when the voltage of the welding current source is above a predetermined value corresponding to the operating voltage of a welding arc supplied thereby. I have used series-connected gaps having spacings respectively of 0.022 and 0.010 inch and a control transformer whose output voltage is less than 4,000 volts, its operating voltage being at between 2,000 and 3,000 volts. The operating frequency of the oscillator is not appreciably affected by the length of its spark gap but the voltage magnitudes of the high-frequency impulses and the frequency of the occurrence of these impulses does depend upon the operating lengths of the spark gap.

When operating with a long spark gap, the oscillator produces a relatively smaller number of impulses of radio frequency per second at higher voltage than when operating with a short spark gap. When the spark gap oscillator is supplied with alternating current voltage, as in Fig. 1, with the size of the capacitor fixed and the charging impedance in the input circuit of the capacitor fixed, the charging rate of the capacitor is proportional to the applied voltage and inversely proportional to the size of the capacitor and the impedance of the input circuit. With these latter fixed, the time to spark gap breakdown varies almost linearly with the voltage setting of the spark gap. The repetition rate of condenser charge and discharge is much faster if the spark gap is set short.

A resistor or inductance, or some other type of impedance in the supply to the capacitor of a spark gap oscillator is an essential part of the circuitry of a spark oscillator. Its function is to limit the short-circuit current supplied from the input power source through the spark gaps during the interval that the high-frequency oscillating current is passing through the gaps. This input current must be limited to a value which the spark gaps will quench after the oscillating current dies down. If this is not done, the spark gaps remain as a short-circuit on the input and the capacitor cannot be recharged for controlling the next high frequency pulse. I have employed a resistor 20 in circuit with the primary of a low-reactance transformer rather than an inductance or using a high-reactance transformer because of the phase angle considerations of the voltage applied to the capacitor and to the welding arc. By employing the circuit disclosed in Fig. 1, I obtain the highest rate of radio frequency power generation at the time near current zero in the welding circuit which is the time that it is needed most.

The operation of the arc welding system of Fig. 1 is as follows:

Upon closing switch 3, the system is energized and the spark gap oscillator is placed in operation with both gaps 24 and 25 being included in the oscillating circuit. High-voltage, high-frequency pulses of voltage are, consequently, introduced into the welding circuit through the coupling transformer 12. When the electrode 14 is brought into arcing distance with the work 16, high-frequency discharges occur across the arc gap, in each case being following by a pulse of power current from transformer 2, until after some number of high-frequency discharges across the arc gap enough total heat is built up in the electrode and work to permit stable flow of arc current from transformer 2.

Upon the flow of welding current to the arc, relay 9 is operated to close its normally open contacts and short-circuit gap 24 which is larger than gap 25. This causes the oscillator 17 to operate with pulses of less magnitude occurring at a more rapid rate than when the oscillator was operating with both gaps effective. These pulses of high-frequency are of sufficient voltage to reionize the arc gap if, at normal current zero, the arc fails to start. If the arc is operating smoothly, insufficient voltage is applied to the oscillator to break down the oscillator spark gap 25 and therefore no radio frequency energy is generated so long as normal welding conditions exist. It will be noted that the system functions so that a long period of current zero cannot occur in the welding arc since the short spark gap setting provides for quick restarting of the arc while welding; and during this time, low-voltage radio frequency energy is adequate because of the ionization already present in the arc gap. Contrariwise, during starting, high-voltage radio frequency is supplied as needed for jumping a long cold gap and a rapid repetition rate during a few cycles of starting is not necessary. By using my invention, a short burst of substantial noise occurs during the starting interval, which as pointed out above sounds like a click in a radio receiver; but the noise level, once the arc is established, will be comparatively very small.

The welding system shown in Fig. 2 is the same as that shown in Fig. 1 except for the arrangement of the spark gaps in oscillator 17. A long multiple electrode spark gap 28 is shunted through the contacts 26 of relay 9 and the short spark gap 29 connected in circuit with these contacts. Thus, as in Fig. 1, operation of relay 9 upon the flow of welding current will change the oscillator from operation with a long spark gap to operation with a shorter spark gap.

In Fig. 3, a voltage relay 30 has been substituted for the current relay 9 of Figs. 1 and 2. Its operating coil 31 is connected across the welding circuit and causes the relay to pick up at voltages of the welding circuit greater than normal operating voltages of an arc established between electrodes 14, 16 in the welding circuit. Thus, on open circuit voltage in the welding circuit, both gaps 24 and 25 of the oscillator are operative whereas, upon the establishment of an arc, the relay drops and closes the contacts 32 to short out the longer arc gap 24.

In Fig. 3, an additional resistor 34 is switched in circuit with the current limiting resistor 20 of Fig. 1 when relay 30 operates to short-circuit spark gap 24 of the oscillator and to short out this resistor when this relay has operated to insert spark gap 24 in the oscillator circuit. This action is accomplished through the actuation of normally open contacts 33 of relay 30 at the same time as its normally closed contacts 32 are operated by operation of relay 30. In Fig. 3, relay 30 has been illustrated in its de-energized position which will also correspond to its position when its winding 31 is energized by voltages less than that of an established welding arc.

When the oscillator 17 is operating with a large gap; that is, with both gaps 24 and 25 effective, it is possible to use a small value of resistance in its input circuit because the large gap can effectively quench a large input of power current to the oscillator and the smaller value of resistance permits firing of the oscillator more often to give more high-frequency output. This increased high-frequency output current makes it easier for the arc current to follow the high frequency while the large gap gives a higher voltage to jump the gap between the electrode and the work. As previously noted above, a small oscillator gap, 25 above, is used while welding to permit the capacitor to charge quickly and fire the oscillator when required. At the same time, a larger resistance 20 and 34, is required in the input circuit of the oscillator to limit the supply of power current to the oscillator to a value that the shorter spark gap can extinguish.

It is, of course, obvious that the embodiments of my invention above described may be variously modified without departing from the spirit and scope of my invention. Thus, other sources of supply, either of alternating or direct current, may be substituted for the high reactance transformer 2 of the drawing. Furthermore, other kinds of spark gap oscillators may be constructed in accordance with my invention to accomplish the functions performed by oscillator 17 of the drawing. Also, other relay arrangements responsive to electrical changes in the welding circuit or its components upon the establishment of a welding arc may be substituted for those shown in the drawing. It is, consequently, to be understood that I claim all such modifications as come within the spirit and scope of my invention.

What I claim as new and desire to secure by Letters Patent of the United States is:

1. Arc welding apparatus comprising a welding current source having at its output terminals a drooping volt-ampere characteristic, a welding circuit connected to said output terminals of said welding current source, a high frequency spark gap oscillator having its output circuit connected in circuit with said welding circuit, means responsive to an electrical change in said welding circuit upon the establishment of an arc supplied therethrough for decreasing the length of the spark gap of said high frequency oscillator and the output voltage thereof from a relatively high value sufficient to strike an arc across an arc gap to a relatively low value sufficient to stabilize the operation of said arc, and means responsive to the voltage of said welding current source for energizing said high frequency spark gap oscillator with a voltage sufficient to set it into operation only when the voltage of said welding current source is above a predetermined value corresponding to the operating voltage of a welding arc supplied by said welding current source through its said welding circuit.

2. Arc welding apparatus comprising an electrical connection for supplying to a welding arc the output current of a welding current source having a drooping volt-ampere characteristic, a high frequency spark gap oscillator having its output circuit connected in circuit with said electrical connection, means responsive to an electrical change in said electrical connection upon the establishment of an arc supplied therethrough for decreasing the length of said spark gap of said high frequency oscillator and the output voltage thereof from a relatively high value sufficient to strike an arc across an arc gap to a relatively low value sufficient to stabilize the operation of said arc, and means responsive to the voltage of said electrical connection for energizing said high frequency spark gap oscillator with a voltage sufficient to set it into operation only when the voltage of said electrical connection is above a predetermined value corresponding to the operating voltage of a welding arc supplied therethrough.

3. Arc welding apparatus comprising a welding current source having at its output terminals a drooping volt-ampere characteristic, a pair of welding circuit conductors respectively connected to the terminals of said welding current source for supplying welding current to a welding arc, a high frequency spark gap oscillator having its output circuit connected in circuit with said pair of welding circuit conductors, means responsive to an electrical change in welding circuit conditions at said pair of welding circuit conductors upon the establishment of an arc supplied through said conductors for decreasing the length of said spark gap of said high frequency oscillator and the output voltage thereof from a relatively high value sufficient to strike an arc across an arc gap to a relatively low value sufficient to stabilize the operation of said arc, and means responsive to the voltage of said welding current source for energizing said high frequency spark gap oscillator with a voltage sufficient to set it into operation only when the voltage of said welding current source is above a predetermined value corresponding to the operating voltage of a welding arc supplied by said welding current source through said welding circuit conductors.

4. Arc welding apparatus comprising an alternating current source at its output terminals having a drooping volt-ampere characteristic, a pair of welding circuit conductors respectively connected to the terminals of said alternating current source for supplying current to a welding arc, a high frequency spark gap oscillator having an input circuit for supplying energization thereto, an output circuit connected to supply an arc through said pair of welding circuit conductors and a plurality of series connected spark gaps, means responsive to a change in welding circuit conditions at said pair of welding circuit conductors upon the establishment of an arc supplied through said conductors for short-circuiting at least one of said gaps of said high frequency oscillator, and a control transformer having a primary winding connected across said output terminals of said alternating current source and having a secondary winding connected to energize said input circuit of said high frequency oscillator, said control transformer supplying a voltage to said input circuit of said oscillator which is sufficient to produce spark gap discharges in said oscillator only when the output voltage of said alternating current source is greater than the voltage of an arc supplied thereby.

5. Arc welding apparatus comprising an alternating current source having at its output terminals a drooping volt-ampere characteristic, a welding circuit conductor connected to one of said terminals of said welding current source for supplying current to a welding arc, a high frequency spark gap oscillator having an input circuit for supplying energization thereto, an output circuit connected to supply an arc through said pair of welding circuit conductors and a plurality of series connected spark gaps, means responsive to welding current flow in said welding circuit conductor for shortcircuiting at least one of said gaps of said high frequency oscillator, and a control transformer having a primary winding connected across said output terminals of said alternating current source and having a secondary winding connected to energize said input circuit of said high frequency oscillator, said control transformer supplying a voltage to said input circuit of said oscillator which is sufficient to produce spark gap discharges in said oscillator only when the output voltage of said alternating current source is greater than the voltage of an arc supplied thereby.

6. Arc welding apparatus comprising an adjustable reactance arc welding transformer operable at commercial frequencies and having a primary winding and a secondary winding, an output circuit connected to the terminals of said secondary winding of said welding transformer for supplying current to a welding arc, a low reactance control transformer having its primary winding connected through a load limiting resistor across the secondary winding of said welding transformer and having its secondary winding connected to energize a high frequency oscillator having in series circuit a capacitor, two spark gaps and the primary winding of a coupling transformer whose secondary winding is connected in circuit with one of said pair of welding circuit conductors, said control transformer being constructed to apply a voltage to the input circuit of said oscillator which is sufficient to produce spark gap discharges in said oscillator only when the output voltage of the secondary winding of said welding transformer is greater than the voltage of an arc supplied thereby through said output circuit, and means responsive to an electrical change in said output circuit upon the establishment of an arc supplied therethrough for shortcircuiting one of said gaps of said high frequency oscillator.

7. Arc welding apparatus comprising an adjustable reactance arc welding transformer operable at commercial frequencies and having a primary winding and a secondary winding, an output circuit connected to the terminals of said secondary winding of said welding transformer for supplying current to a welding arc, a low reactance control transformer having its primary winding connected through a load limiting resistor across the secondary winding of said welding transformer and having its secondary winding connected to energize a high frequency oscillator having in series circuit a capacitor, two spark gaps and the primary winding of a coupling transformer whose secondary winding is connected in circuit with one of said pair of welding circuit conductors, said capacitor having a charging time of the order of $\frac{1}{10}$ of the half cycle of the voltage supplied by said control transformer and said control transformer being constructed to apply a voltage to the input circuit of said oscillator which is sufficient to produce spark gap discharges in said oscillator only when the output voltage of the secondary winding of said welding transformer is greater than the voltage of an arc supplied thereby through said output circuit, and means responsive to an electrical change in said output circuit upon the establishment of an arc supplied therethrough for shortcircuiting one of said gaps of said high frequency oscillator.

8. Arc welding apparatus comprising an adjustable reactance arc welding transformer operable at commercial frequencies and having a primary winding and a secondary winding, a pair of welding circuit conductors respectively connected to the terminals of said secondary winding of said welding transformer for supplying current to a welding arc, a low reactance control transformer having its primary winding connected through a load limiting resistor across the secondary winding of said welding transformer and having its secondary winding connected to energize a high frequency oscillator having in series circuit a capacitor, two spark gaps, and the primary winding of a coupling transformer whose secondary winding is connected in circuit with one of said pair of welding circuit conductors, said control transformer being constructed to apply a voltage to the input circuit of said oscillator which is sufficient to produce spark gap discharges in said oscillator only when the output voltage of the secondary winding of said welding transformer is greater than the voltage of an arc supplied thereby through said pair of welding circuit conductors, means responsive to an electrical change in welding circuit conditions at said pair of welding circuit conductors upon the establishment of an arc supplied through said conductors for shortcircuiting one of said spark gaps of said high frequency oscillator, and a high frequency bypass capacitor connected across said pair of welding circuit conductors to form with said secondary winding of said coupling transformer a localized circuit directly connected for supplying high frequency voltage and current to an arc in circuit with said pair of welding circuit conductors.

No references cited.